(12) United States Patent
Rivoir et al.

(10) Patent No.: US 7,136,770 B2
(45) Date of Patent: Nov. 14, 2006

(54) USING COMPONENT-LEVEL CALIBRATION DATA TO REDUCE SYSTEM-LEVEL TEST

(75) Inventors: Jochen Rivoir, Magstadt (DE); John McLaughlin, Santa Rosa, CA (US); Joseph M. Gorin, Santa Rosa, CA (US); Moray Denham Rumney, Edinburgh (GB); Matthew Johnson, Spokane, WA (US); Robert Locascio, Crystal Lake, IL (US); Peter J. Cain, Lasswade Midlothian (GB); David H. Molinari, Newman Lake, WA (US); George S. Moore, Veradale, WA (US)

(73) Assignee: Agilent Technologies, Inc., Santa Clara, CA (US)

( * ) Notice: Subject to any disclaimer, the term of this patent is extended or adjusted under 35 U.S.C. 154(b) by 0 days.

(21) Appl. No.: 10/700,831

(22) Filed: Nov. 3, 2003

(65) Prior Publication Data
US 2005/0114112 A1    May 26, 2005

(51) Int. Cl.
*G01R 31/00* (2006.01)
*G01R 31/14* (2006.01)

(52) U.S. Cl. .................................................. 702/117
(58) Field of Classification Search .................. 702/85, 702/107, 108, 109, 117, 118, 182; 703/14, 703/20–22
See application file for complete search history.

(56) References Cited

U.S. PATENT DOCUMENTS

| 6,090,151 A | * | 7/2000 | Gehman et al. ............... 716/5 |
| 2004/0167765 A1 | * | 8/2004 | Abu El Ata ................... 703/22 |

* cited by examiner

*Primary Examiner*—Michael Nghiem
(74) *Attorney, Agent, or Firm*—Robert T. Martin

(57) ABSTRACT

Using component-level test data to reduce system test. By modeling a system, sensitivity analysis reveals critical components and parameters of those components required to meet system performance parameters. Critical components are tested for these parameters, and these measurements associated with the components. Systems may be assembled which are modeled to meet the system performance parameters based on the model and the measured parameters. Systems may be assembled and calibration coefficients derived and applied from the model and the measured parameters.

12 Claims, 1 Drawing Sheet

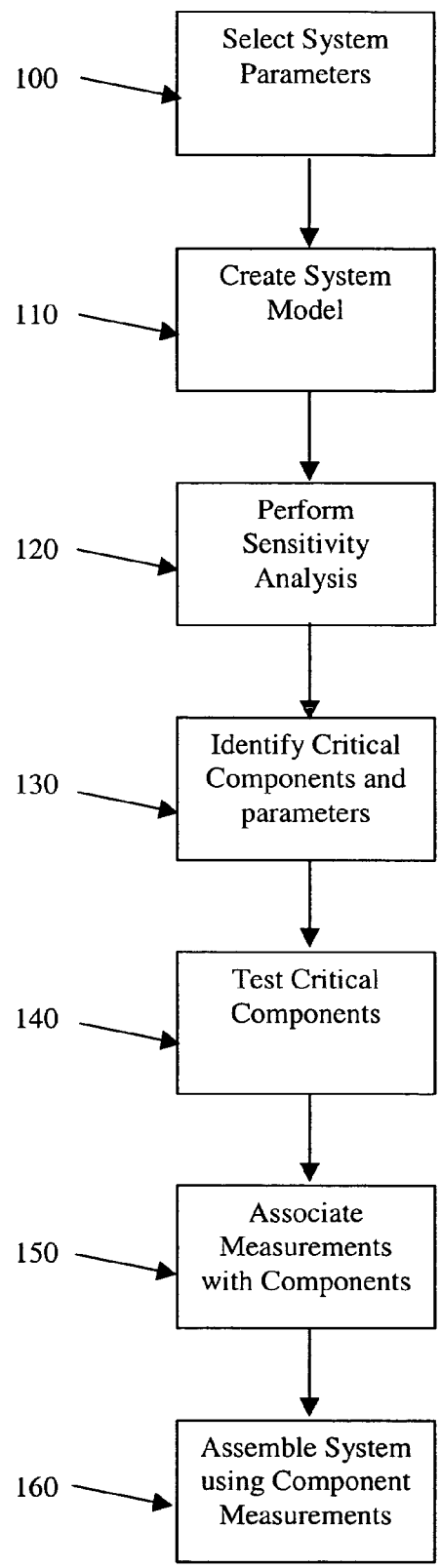
*Figure*

USING COMPONENT-LEVEL CALIBRATION DATA TO REDUCE SYSTEM-LEVEL TEST

BACKGROUND OF THE INVENTION

1. Field of the Invention

The present invention pertains to the use of component-level measurement data in the production of systems using such components, and more particularly, to using component-level measurement data to reduce system level test and calibration requirements.

2. Art Background

In the assembly of electronic devices such as wireless devices including for example wireless data transceivers and wireless phones, it is common that the components used to assemble these devices have been partially or fully tested. Once the device is assembled, additional tests are performed to insure the device meets its specifications.

During component manufacture, for example the manufacturing of monolithic microwave integrated circuits (MMICs), it is common for the manufacturer to perform parametric tests on the devices, often sorting them into performance groups, and charging a premium for components with desirable characteristics, such as low noise, frequency response, compression point, or other parameters.

Yet when these components are assembled into a board or a system such as a transceiver or wireless phone, system level test and calibration are performed, often involving tests and measurements which are redundant in light of earlier component qualification and test.

SUMMARY OF THE INVENTION

System level calibration and test of a device is reduced by reusing component level test data. Results of test performed at the component level are retained and combined with a model of the system to predict performance and reduce or eliminate system-level tests. The system model and sensitivity analysis on the system model may be used to identify parameters and ranges of those parameters to be measured for various components. Measurement values may be stored with a component, or associated with a component.

BRIEF DESCRIPTION OF THE DRAWINGS

The present invention is described with respect to particular exemplary embodiments thereof and reference is made to the drawings in which:

FIGURE shows a flowchart of the present invention.

DETAILED DESCRIPTION

In the manufacture of electronic devices, components are assembled into larger units or systems. It is often the case that many components are tested at the time of their manufacture to verify performance. Such testing may include additional tests to separate out components based on particular parameters; for example in testing monolithic microwave integrated circuits (MMICs), parts may be segregated based on parameters such as noise level, frequency response, compression point, gain, and the like.

According to the present invention, such test data is reused in the manufacturing process, resulting in the reduction of system-level calibration and test.

FIGURE shows a flowchart of the present invention.

The first step in the process is to select 100 those system parameters which are to be modeled. These typically are those aspects of system performance required to meet system and/or regulatory specifications. For wireless devices, characteristics key to transmitter and receiver performance may be selected.

Next, given these system parameters, produce a model of the system 110 which models the interaction between components. This model must reflect interaction between components to a degree that it can model the influence of component-level variations on overall system performance and the parameters selected.

Sensitivity analysis is then performed 120 on the resulting model. The sensitivity analysis determines 130 which components and which parameters of those components affect the key parameters. Sensitivity analysis may reveal that certain components do not require specific testing. As an example, if a sensitivity analysis shows that a certain capacitor may vary in value over a range of −10% to +15%, and the capacitor is manufactured to a tolerance of +/−5%, no additional testing is required. The analysis may indicate however, that a particular component and parameter is critical, such as the IP3 value of an amplifier to transmitter performance.

As part of the sensitivity analysis identifying critical components and parameters, the system model may be used to calculate system calibration coefficients based on component performance parameters. Using this information, system level performance after calibration may also be modeled using performance parameters and the calculated calibration coefficients.

Prior to system assembly, components identified as critical by the sensitivity are tested 140 to measure all parameters identified as critical to system performance.

These measurements must be associated with 150 the component. Measurement data may be kept on an individual component basis, or on a batch basis.

On a batch basis, measured components may be batched in measurement bins, each bin containing components with critical parameters in a given subrange.

When measurement data is kept on an individual component basis, a component and its measurement data may be associated in a number of ways. The component may be individually identified, and this identification associated with the measurement data in a database. Such identification may include but is not limited to serial numbers, sequence numbers and the like which may be marked on the part or readable from within the part. The component may be identified by its position in a component carrier, such as its position on a reel or tape of components, or its position in a sequence of components in the manufacturing process. With larger components, measurement values may be stored with the component, such as in an electrical memory embedded in the component, an electrical memory attached to the component, or encoded in markings placed on the component.

In some systems, performance meeting the key system parameters may be obtained by the proper matching of components using the system model and sensitivity analysis. A system which meets these key system parameters may therefore be assembled 160 using properly matched key components.

In other systems, after assembly 160 the measurement results from all relevant components are retrieved, and the necessary calibration coefficients based on these measurements are calculated. The calibration parameters are applied to the assembled system.

The system itself, or an external test system then uses the model to predict system performance based on the measurement results of all relevant components and the calibration coefficients and decides whether the predicted system level performance meets the required specifications.

The foregoing detailed description of the present invention is provided for the purpose of illustration and is not intended to be exhaustive or to limit the invention to the precise embodiments disclosed. Accordingly the scope of the present invention is defined by the appended claims.

What is claimed is:

1. A method of constructing an electronic system from a set of components comprising:
    selecting one or more key system parameters,
    creating a model of the system based on component performance,
    performing a sensitivity analysis on the model to identify critical components and parameters of those components required to meet the key system parameters,
    associating an identifier with each of the critical components,
    performing tests on the identified critical components to measure the identified parameters producing a set of measurements for each critical component,
    associating the set of measurements with the critical component,
    storing the set of measurements as an entry in a database,
    associating the database entry with an identifier for each of the critical components,
    selecting individual critical components for assembly into a system based on the associated measurements such that the resulting system meets the key system parameters, and
    assembling the system using the measurements associated with the components.

2. The method of claim 1 where the identifier for the critical component is a serial number.

3. The method of claim 1 where the identifier for the critical component is a sequence number.

4. The method of claim 1 where the identifier for the critical component is a location in a component carrier.

5. The method of claim 1 where assembling the system using the measurements associated with the critical components further comprises:
    assembling the system from a set of components,
    retrieving the measurements associated with each of the set of identified critical components, and
    calculating system calibration coefficients using the retrieved measurements.

6. The method of claim 5 where associating the set of measurements further comprises storing the set of measurements in a memory which is part of the critical component.

7. The method of claim 5 where associating the set of measurements further comprises storing the set of measurements in a memory which is attached to the critical component.

8. The method of claim 5 where associating the set of measurements further comprises storing the set of measurements as an entry in a database, and
    associating the database entry with an identifier for the critical component.

9. The method of claim 8 where the identifier for the critical component is a serial number.

10. The method of claim 8 where the identifier for the critical component is a sequence number.

11. The method of claim 8 where the identifier for the critical component is a location in a component carrier.

12. The method of claim 5 where associating the set of measurements further comprises grouping components according to measurements.

* * * * *